(12) United States Patent
Morris

(10) Patent No.: US 7,752,047 B2
(45) Date of Patent: Jul. 6, 2010

(54) ENVIRONMENTAL CONDITION DETECTOR WITH SPEECH RECOGNITION

(76) Inventor: Gary J. Morris, 2026 Glenmark Ave., Morgantown, WV (US) 26505

( * ) Notice: Subject to any disclaimer, the term of this patent is extended or adjusted under 35 U.S.C. 154(b) by 1121 days.

(21) Appl. No.: 10/422,368

(22) Filed: Apr. 24, 2003

(65) Prior Publication Data

US 2003/0229500 A1 Dec. 11, 2003

Related U.S. Application Data

(60) Provisional application No. 60/376,740, filed on May 1, 2002.

(51) Int. Cl.
*G10L 15/00* (2006.01)
(52) U.S. Cl. .................. 704/251; 704/246; 704/273; 704/274; 704/275
(58) Field of Classification Search ............... None
See application file for complete search history.

(56) References Cited

U.S. PATENT DOCUMENTS

| | | | | |
|---|---|---|---|---|
| 3,855,574 | A * | 12/1974 | Welty | 340/309.8 |
| 4,827,244 | A * | 5/1989 | Bellavia et al. | 340/514 |
| 4,876,676 | A * | 10/1989 | Shimizu et al. | 368/63 |
| 5,289,165 | A | 2/1994 | Belin | |
| 5,349,338 | A * | 9/1994 | Routman et al. | 340/692 |
| 5,442,336 | A | 8/1995 | Murphy et al. | |
| 5,815,066 | A | 9/1998 | Pumillia | |
| 5,991,726 | A | 11/1999 | Immarco et al. | |
| 6,091,328 | A * | 7/2000 | Ichikawa et al. | 340/506 |
| 6,133,839 | A | 10/2000 | Ellul et al. | |
| 6,172,612 | B1 | 1/2001 | Odachowski | |
| 6,266,995 | B1 * | 7/2001 | Scott | 73/23.2 |
| 6,326,880 | B1 | 12/2001 | Tice | |
| 6,346,880 | B1 | 2/2002 | Schroeder et al. | |
| 6,351,212 | B1 * | 2/2002 | Lynch | 340/506 |
| 6,380,854 | B1 | 4/2002 | Hagerman et al. | |
| 6,496,111 | B1 * | 12/2002 | Hosack | 340/540 |
| 6,522,248 | B1 * | 2/2003 | Andres et al. | 340/521 |
| 6,552,647 | B1 * | 4/2003 | Thiessen et al. | 340/3.1 |
| 6,584,439 | B1 | 6/2003 | Geilhufe et al. | |
| 6,624,750 | B1 * | 9/2003 | Marman et al. | 340/506 |
| 6,999,923 | B1 * | 2/2006 | Ablondi et al. | 704/231 |
| 2001/0024163 | A1 * | 9/2001 | Petite | 340/628 |
| 2002/0021231 | A1 * | 2/2002 | Schlager et al. | 340/984 |
| 2002/0067286 | A1 * | 6/2002 | Hsu et al. | 340/901 |
| 2002/0107694 | A1 * | 8/2002 | Lerg | 704/273 |

FOREIGN PATENT DOCUMENTS

JP 10241070 * 9/1998

* cited by examiner

*Primary Examiner*—Richemond Dorvil
*Assistant Examiner*—Leonard Saint Cyr
(74) *Attorney, Agent, or Firm*—Gary J. Morris

(57) ABSTRACT

An ambient condition detector incorporates speech recognition circuitry for the receipt of verbal commands in a selected language. The commands can be used to initiate functions, such as tests of various components of the detector, or over-all detector operation. Test results can be reported audible, for example by tones, verbally or optically. Recognizable commands and messages can be pre-recorded and not user alterable. Other types of functions can be verbally initiated. Alternately, the user can expand upon the pre-recorded set of commands, or, can record a user specific set of commands.

38 Claims, 2 Drawing Sheets

ENVIRONMENTAL CONDITION DETECTOR WITH SPEECH RECOGNITION

The benefit of a May 1, 2002 filing date for Provisional Patent Application Ser. No. 60/376,740 is hereby claimed.

FIELD OF THE INVENTION

This invention relates to circuitry for testing the functionality of an environmental condition detector through verbal commands. Additionally, other diagnostic information from the detector can be polled through verbal commands such as the state of the battery power supply if one is present. Alarm silencing can also be controlled by verbal commands.

BACKGROUND OF THE INVENTION

Such detectors provide enhanced safety environments for people indoors including residences, businesses, the workplace, or schools.

Ambient condition detectors have been recognized as being very useful in providing early alerts in connection with developing fire or gas conditions. Such detectors provide enhanced safety environments for people indoors including residences, businesses, the workplace, schools, etc. These detectors may report the presence of potential dangers such as the presence of smoke, fire, hazardous gas, heat, light, sound, vibration, and/or motion in proximity of the detector.

As part of the regular maintenance of environmental condition detectors, it is desirable to regularly test the respective device to determine that it is functioning properly. If the detector includes a battery as a power supply, then it is also desirable to routinely test the device to determine the state of the battery.

Many detectors incorporate a "push-to-test" button which provides an indication of the performance of the unit in response to depressing the test switch. It is also known to be able to initiate tests or to silence detectors remotely, such as using a source of light or RF as disclosed in Bellavia et al U.S. Pat. No. 4,827,244 entitled Light Activated Test System.

Given the fact that ambient condition detectors which sense smoke are usually mounted on ceilings and out of reach, the use of test buttons is not always convenient. Additionally, while being able to test a detector remotely can be desirable, it can also be inconvenient to provide a source of light or RF to carry out such testing. Finally, other types of detectors, such as motion detectors or gas detectors, may be mounted on ceilings or at other elevated locations inconvenient for testing.

There continues to be a need for detectors which provide greater ease in carrying out remotely initiated tests or other functions as desired. Preferably, such capability could be provided without having to substantially increase the manufacturing costs or complexity of such detectors. Further, it would be desirable if such testing or activation of other functions could be initiated without any need for auxiliary equipment.

DETAILED DESCRIPTION OF THE EMBODIMENTS

Figure 1:
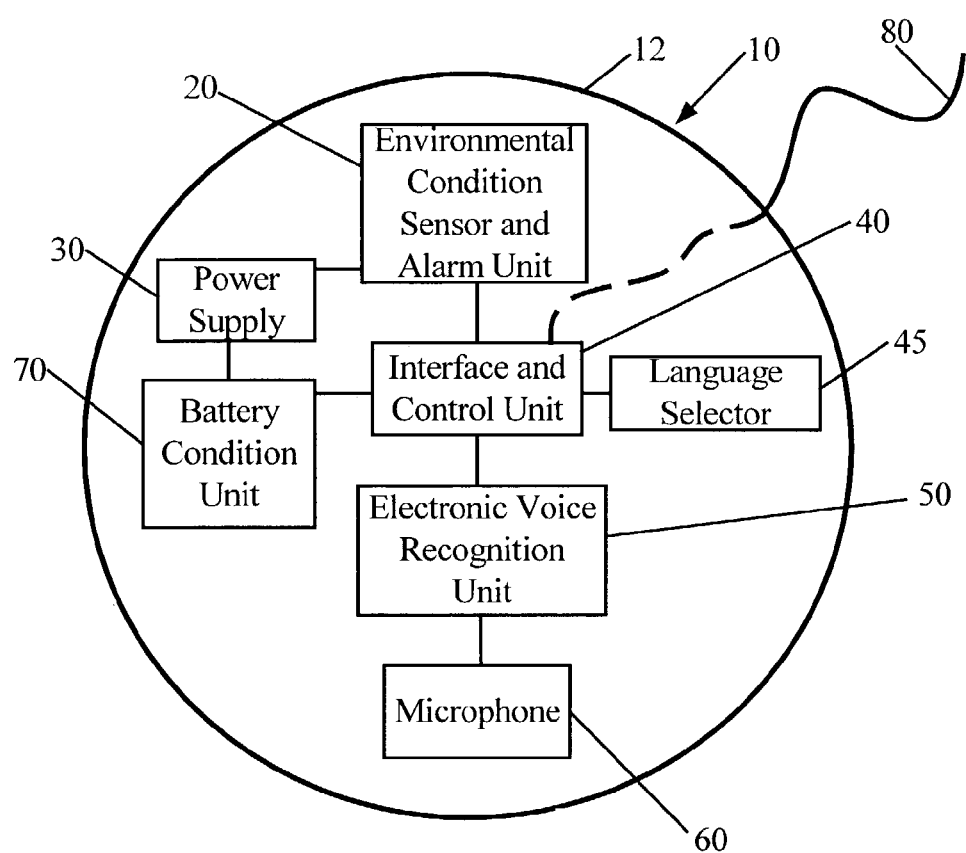
FIG. 1 is a diagram of a preferred embodiment of the environmental condition detector with voice initiated testing according to the invention.

While embodiments of this invention can take many different forms, specific embodiments thereof are shown in the drawings and will be described herein in detail with the understanding that the present disclosure is to be considered as an exemplification of the principles of the invention and is not intended to limit the invention to the illustrated specific embodiments.

An exemplary environmental condition detector with voice operated testing 10 is illustrated in FIG. 1. Detector 10 includes several electrical components carried in a substantially closed housing 12. Housing 12 permits an inflow and outflow of ambient air for sensing purposes, as would be understood by those of skill in the art.

An environmental condition sensor and alarm unit 20 senses the presence of an environmental condition in the vicinity of detector 10. The environmental condition sensed by the unit 20 includes at least one of: smoke, fire, carbon monoxide, heat, gas, light, motion, vibration, and/or sound. A power supply 30 can be implemented, for example, with a battery or with an alternating current power supply with a direct current converter. An optional battery back-up can be provided.

When detector 10 goes into alarm, it emits an audible alarm, for example a tonal pattern. One such configuration with a voice output is disclosed in Morris U.S. Pat. No. 6,144,310 incorporated hereby by reference.

An electronic voice recognition unit 50 recognizes verbal messages received by a microphone (audio transducer) 60. An interface and control unit 40 links the sensing and alarm circuitry 20 with the electronic voice recognition unit 50 and an optional battery condition test unit 70.

The present invention makes use of the human voice to remotely initiate a function of an environmental condition detector, such as detector 10. No article is needed to initiate the function.

A person simply speaks a command code(s), word, or phrase to activate the respective function. Exemplary functions include initiating a test of over-all functionality, testing battery condition, checking sensitivity, or temporarily silencing an active detector.

An audio transducer 60 located within the detector housing receives a verbal command. Control circuits, such as a microprocessor-based system, electronically recognize the command and initiate the function specified by the verbal command.

One exemplary function is a diagnostic test to determine if the detector is functioning properly. In a preferred embodiment, in response to a received and recognized verbal command, the diagnostic test is carried out. Proper functionality can be indicated by sounding an alarm as if the environmental condition was sensed. It will be understood that a failure to pass the test could be indicated by a different audible or visual output.

Another exemplary function is to determine the state of a battery used in the detector, either as the primary power supply or back-up power supply. The battery state can be reported by a visual display, such as at least one light emitting diode, a liquid crystal display, or by an audible output (tonal or verbal) or any combination thereof. Other types of tests can be initiated. A voice activated temporary silencing function can also be provided.

The verbal command set can be programmed into an electronic memory of the detector at the factory in one embodiment. Alternately, it can be programmed into the electronic memory of the detector by the user using microphone 60.

In order to minimize the chance of false triggering of a function or a test due to spurious noises, one embodiment incorporates a multiple step verbal command sequence. The first received and recognized verbal command can be used to prepare the detector to receive and recognize at least a second verbal command. The second command directs the detector to enter into the desired functional or diagnostic mode. After reception of the first received and recognized verbal command, if a second verbal command is not received and recognized within a preset time interval, the detector re-enters its waiting mode to receive a first verbal command. It will be understood that more than two levels of verbal command sequencing may be used to alleviate false triggering.

In connection with multiple levels of multiple command sequencing, feedback can be provided to the user confirming that each level has been recognized. For example, after the initial command has been received and recognized, the detector can emit a visual/audible confirmatory output to provide a cue to the user to proceed.

In one embodiment of the invention, in order to accommodate various language types, the verbal command set can be pre-programmed, into the detector's electronic memory in more than one language. For example, the command sets could be stored in memory in the recognition unit 50. The user selects the language type by use of a switch 45 or by a verbal command.

The battery condition test unit 70 consists of a direct current voltage measurement circuit to determine the state of charge of any battery power supplies.

The interface and control unit 40 receives inputs from the electronic voice recognition unit 50 and carries out a requested function such as a test of at least one electronic component of the alarm unit 20 in response to the appropriate verbal command.

The voice recognition unit 50 can be factory programmed to be user voice independent and to recognize a standard set of verbal commands. Signals from unit 50, responsive to recognized commands can be coupled to the interface and control unit 40 to implement, for example, diagnostic testing of the alarm unit 40 or a battery in supply 30 via the battery condition test unit 70. Test results can be reported to the user through a visible display, tones, voice output or any other audible output devices as would be known to those of skill in the art.

In another embodiment, the verbal command sets for the detector 10 may be recorded by the user, using microphone 60, and stored in electronic memory in the voice recognition unit 50. This configuration provides a very user specific, pre-stored verbal signature command set. The voice recognition unit 50 can compare its audio inputs thereto for recognition.

The voice recognition unit 50 can also be used to silence an unwanted audible alarm that emanates from the alarm unit 20. During prescribed silent periods in the tonal alarm pattern, the user can utter a verbal command to silence the alarm for a predetermined period.

In one embodiment, detector 10 can be implemented as a stand alone, single station device. In another embodiment of the invention, detector 10 can be part of a multiple detector system. In this embodiment, detectors that are hardwired interconnected together through electrical conductors 80 linking the detectors. A wireless transceiver link (not shown) can be implemented in each detector 10.

Figure 2:
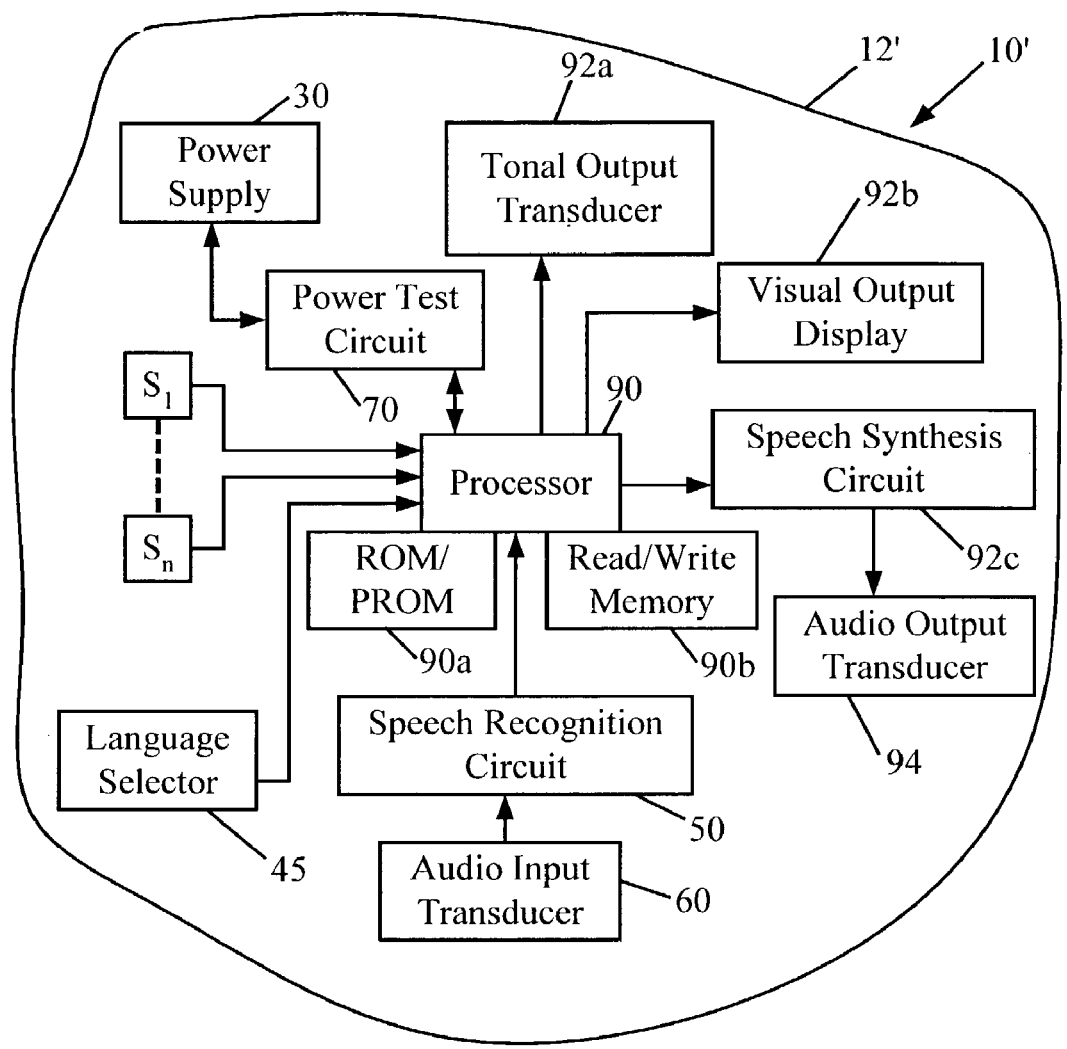
FIG. 2 is a block diagram of another detector in accordance with the invention.

FIG. 2 is a block diagram illustrating an embodiment of a detector 10' in accordance with the present invention. Elements of the detector 10' which are the same as those elements in detector 10 have been assigned a common identification numeral.

The detector 10' includes control circuits implemented by a programmable processor 90. The processor 90 receives as inputs signals from one or more ambient condition sensors S1, S2 ... Sn. These could be, as noted above, fire sensors, gas sensors, motion sensors, position sensors or the like all without departing from the spirit and scope of the present invention.

Read-only memory and/or programmable read-only memory 90a and read/write memory 90b are both coupled to processor 90. A plurality of executable control instructions can be pre-stored in read-only memory or programmable read-only memory 90a for execution by processor 90.

An audio input transducer 60, for example a microphone, coupled to the speech recognition circuitry 50 provides inputs to the processor 90 as to commands in a selected language which have been recognized in circuitry 50. It will be understood that some or all of the speech recognition circuitry 50 could be incorporated into processor 90 and associated executable instructions, stored in memory 90a, without departing from the spirit and scope of the present invention.

Processor 90 can carry out a plurality of pre-determined tests of various components of the detector 10' such as the power supply 30, which could incorporate a replaceable battery as the primary source of energy or a utility energized supply with a battery back-up.

Output devices coupled to processor 90 include a tonal output transducer 92a of a type which will be known to those of skill in the art for producing loud continuous or interrupted alarm indicating tones in response to one or more of the sensors S1 providing signals to processor 90 indicative of an alarm condition. Processor 90 is also coupled to visual output device 92b. The output device 92b could be for example light emitting diodes or liquid crystal displays, all without limitation.

Detector 10' can also include speech synthesizing circuitry 92c coupled to and driven from processor 90. Speech synthesizing circuitry 92c provides audible outputs via audio output transducer 94 as an alternate to tonal outputs from transducer 92a or outputs from visual output unit 92b. It will also be understood that the audio output transducer 94, which could be implemented as a speaker, could also be used to provide tonal outputs along with synthesized speech. In such an embodiment, only a single audio output transducer 94 would be necessary.

In accordance with the above, a user could verbally direct detector 10' to carry out one or more predetermined test functions, using pre-assigned test commands. Alternately, the user could enter his or her own set of test commands using input transducer 60. A voice actuated silencing function can also be provided in detector 10' and enabled via a verbal command received at transducer 60.

The various preferred embodiments described above are merely descriptive of the present invention and are in no way intended to limit the scope of the invention. Modification of the present invention will become obvious to those skilled in the art in light of the detailed description above, and such modifications are intended to fall within the scope of the appended claims.

It is to be understood that no limitation with respect to the specific apparatus illustrated herein is intended or should be inferred. It is, of course, intended to cover by the appended claims all such modifications as fall within the scope of the claims.

What is claimed:

1. An environmental condition detector comprising: an environmental condition sensor; control circuitry coupled to the sensor; the sensor senses an indoor presence of an environmental condition in the ambient vicinity of the detector; speech recognition circuitry coupled to the control circuitry in response to audible verbal commands recognized by the recognition circuitry, the control circuitry initiates one of a selected non-test function of the detector or a test of the detector, wherein a first received and recognized verbal command prepares the detector to receive and recognize at least a second verbal command; after reception of first recognized verbal command, if a second verbal command is not received and recognized within a preset time interval, the detector re-enters a waiting mode to receive a first verbal command; an output device, coupled to the control circuitry which indicates a test result; the sensor comprises at least one of a smoke sensor, a fire sensor, a carbon monoxide sensor, a heat sensor, or a motion sensor; and a housing which contains the sensor, the circuitry and the output device.

2. A detector as in claim 1 which includes a power source, the test comprising a condition test of at least part of the source.

3. A detector as in claim 2, the output device comprises at least one of a visual output device or a verbal output device.

4. A detector as in claim 1 with the output device comprising at least one of a visual output device or a verbal output device.

5. A detector as in claim 4, the control circuit initiating a battery test.

6. A detector as in claim 1 wherein the test is one of a battery test or a detector component test and in response to a recognized audible verbal command, the control circuit initiates the respective test and outputs a verbal test report.

7. A detector as in claim 1 where the control circuitry, in response to a recognized audible verbal command, temporarily terminates an audible alarm indicating output where the recognized audible verbal command is uttered during a prescribed silence period within a tonal pattern of the audible alarm indicating output.

8. A detector as in claim 1 where the control circuitry includes a programmed processor.

9. A detector as in claim 1 wherein the detector is directly connected to at least one other displaced detector through a hardwired or wireless connection thereby forming a multiple detector system whereby no detector is a component of a centrally monitored alarm system.

10. The detector of claim 1 wherein after the first verbal command has been received and recognized, the detector emits a confirmatory output to provide a cue for a user to proceed.

11. A verbally responsive environmental condition detector comprising: a housing; at least one ambient condition sensor carried in the housing; speech recognition circuitry, carried in the housing and responsive to verbal input from a displaced source; control circuitry, coupled to the sensor, responsive to outputs therefrom to establish the presence of a predetermined alarm condition, the control circuitry is also coupled to the speech recognition circuitry and is responsive to recognized audible verbal input to implement a function corresponding to the audible verbal input, wherein a first received and recognized verbal command prepares the detector to receive and recognize at least a second verbal command;

after reception and recognition of the first verbal command, if a second verbal command is not received and recognized within a preset time interval, the detector re-enters a waiting mode to receive a first verbal command;

the sensor senses an indoor presence of an environmental condition in the ambient vicinity of the detector;

an audio output transducer coupled to the control circuitry to emit an audible alarm when the sensor senses the environmental condition;

the sensor comprises at least one of a smoke sensor, a fire sensor, a carbon monoxide sensor, a heat sensor, or a motion sensor;

the housing contains at least the sensor, the control circuitry and the audio output transducer; and the detector is not connected to a centrally monitored alarm system.

12. A detector as in claim 11 which includes a second, different ambient condition sensor carried in the housing.

13. A detector as in claim 12 where the control circuitry includes circuitry, responsive to two different received audible verbal inputs, to implement a test of each of the first and second sensors.

14. A detector as in claim 11 where the control circuitry comprises a programmed processor.

15. A detector as in claim 14 which includes executable instructions for implementing at least two different speech specified detector functions.

16. A detector as in claim 15 where one of the functions is a detector silence function and, another function is a predetermined test.

17. A detector as in claim 16 which includes an input audio transducer coupled to the control circuitry, and executable instructions for storing indicia of a plurality of user verbalized commands.

18. A detector as in claim 17 which includes a single audible output transducer for audible alarm signals and any audible voice outputs.

19. A detector as in claim 17 which includes executable instructions for responding to selection of an input language for the audible verbal inputs.

20. A detector as in claim 11 where the speech recognition circuitry recognizes, one audible verbal command associated with conducting a test of the sensor, and another audible verbal command associated with initiating a non-test function.

21. The detector of claim 11 wherein after the first verbal command has been received and recognized, the detector emits a confirmatory output to provide a cue for a user to proceed.

22. An environmental condition detector receiving at least one audible verbal command to test the functionality of the detector comprising: a housing, at least one sensor for detecting an indoor presence of an environmental condition in the ambient vicinity of the detector, a first electronic circuit for activation of an audio output transducer to emit an alarm having an audible tonal pattern for the duration of the detection of the environmental condition; speech recognition circuits for receiving and electronically recognizing audible verbal commands and thereby initiating at least one diagnostic test of at least one electronic component of the environmental condition detector, wherein a first received and recognized verbal command prepares the detector to receive and recognize at least a second verbal command;

after reception and recognition the first verbal command, if a second verbal command is not received and recognized within a preset time interval, the detector re-enters a waiting mode to receive a first verbal command;

a power source selected from a group including a battery, a non-battery power supply, and a non-battery power supply with battery backup;

the sensor comprises at least one of a smoke sensor, a fire sensor, a carbon monoxide sensor, a heat sensor, or a motion sensor;

the housing contains at least the sensor, the first electronic circuit, and the audio output transducer; and the detector functions as a stand-alone unit.

23. The environmental condition detector of claim 22 wherein the at least one sensor comprises at least two different types of sensors selected from a group including a smoke sensor, a heat sensor, a carbon monoxide sensor, a gas sensor, a motion sensor, a vibration sensor, a light sensor, a sound sensor, and any multiple combination of these environmental condition sensor types.

24. The environmental condition detector of claim 23 including circuitry to select one of a plurality of languages for the audible verbal command to be recognized.

25. The environmental condition detector of claim 22 which includes verbally responsive circuits to terminate an output audible tonal pattern for a prescribed time period upon reception of at least one audible verbal command uttered during prescribed silence periods within the audible tonal pattern.

26. An environmental condition detector receiving at least one audible verbal command to test the condition of a battery in the detector comprising: a housing; at least one sensor for detecting an indoor presence of an environmental condition in the ambient vicinity of the detector, control circuitry that activates an audio output transducer to emit an alarm having an audible tonal pattern for the duration of the detection of said environmental condition; speech recognition circuitry that receives and electronically recognizes audible verbal commands and thereby initiating at least one diagnostic test to provide a report of the condition of a selected element of the detector, wherein a first received and recognized verbal command prepares the detector to receive and recognize at least a second verbal command;

after reception and recognition of the first verbal command, if a second verbal command is not received and recognized within a preset time interval, the detector re-enters a waiting mode to receive a first verbal command;

a power source selected from a group including a battery and a non-battery power supply with a battery back-up;

the at least one sensor comprises at least one of a smoke sensor, a fire sensor, a carbon monoxide sensor, a heat sensor, or a motion sensor;

the housing contains at least the sensor, the control circuitry, and the audio output transducer; and the detector is not a component of a centrally monitored alarm system.

27. The environmental condition detector of claim 26 wherein the at least one sensor comprises at least two different types of sensors selected from a group that includes a smoke sensor, a heat sensor, a carbon monoxide sensor, a gas sensor, a motion sensor, a vibration sensor, a light sensor, a sound sensor, and any multiple combination of sensor types.

28. The environmental condition detector of claim 26 wherein the report comprises an electronically pre-recorded verbal message.

29. The environmental detector of claim 26 wherein the report comprises a visual display.

30. The environmental condition detector of claim 26 which includes circuits to select from more than one language in which the audible verbal commands are to be verbalized.

31. An environmental condition detector receiving audible verbal commands and electronic speech recognition to test the functionality of the detector comprising: a housing; at least one sensor that detects an indoor presence of an environmental condition in the ambient vicinity of the detector; control circuitry that activates an audio output transducer to emit an alarm having an audible tonal pattern for the duration of the detection of said environmental condition; speech recognition circuitry that receives and electronically recognizes said audible verbal commands and thereby initiating at least one diagnostic test of at least one electronic component of said environmental condition detector, wherein a first received and recognized verbal command prepares the detector to receive and recognize at least a second verbal command;

after reception and recognition of the first verbal command, if a second verbal command is not received and recognized within preset time interval, the detector re-enters a waiting mode to receive a first verbal command;

an electronic memory in which the user can record at least one verbal command for user dependent speech recognition; the at least one sensor comprises at least one of a smoke sensor, a fire sensor, a carbon monoxide sensor, a heat sensor, or a motion sensor;

a power source selected from the group including a battery, a non-battery power supply, and a non-battery power supply with a back-up power supply;

the housing contains at least the sensor, the control circuitry, and the audio output transducer; and the detector is independent of a centrally monitored system.

32. The environmental condition detector of claim 31 wherein the at least one sensor comprises at least two different types of sensors selected from the group including a smoke detector, a heat detector, a carbon monoxide detector, a gas detector, a motion detector, a vibration detector, a light detector; a sound detector, and any multiple combination of these environmental condition detector types.

33. The environmental condition detector of claim 31 wherein the control circuitry terminates said audible tonal pattern for a prescribed time period upon reception by the speech recognition circuitry, during prescribed periods of audible tonal pattern silence, of audible verbal commands.

34. The environmental condition detector of claim 31 including electronic circuits to select from more than one language type in which audible verbal commands are recognized.

35. An environmental condition detector receiving audible verbal commands and electronic speech recognition to remotely test the condition of the battery power supply of the detector comprising: a housing; at least one sensor that detects an indoor presence of an environmental condition in the ambient vicinity of the detector; control circuitry that activates an audio output transducer to emit an alarm having an audible tonal pattern for the duration of the detection of said environmental condition; speech recognition circuitry that receives and electronically recognizes said audible verbal commands and thereby initiating at least one diagnostic test to provide a report of the condition of said battery power supply, wherein a first received and recognized verbal command prepares the detector to receive and recognize at least a second verbal command;

after reception and recognition of the first verbal command, if a second verbal command is not received and recognized within a preset time interval, the detector re-enters a waiting mode to receive a first verbal command;

an electronic memory in which the user records at least one verbal command for user dependent speech recognition;

a power source selected from the group including a battery and a non-battery source with a battery back-up;

the at least one sensor comprises at least one of a smoke sensor, a fire sensor, a carbon monoxide sensor, a heat sensor, or a motion sensor;

the housing contains at least the sensor, the control circuitry, and the audio output transducer; and the detector does not communicate with a centrally monitored system.

36. The environmental condition detector of claim 35 wherein the at least one sensor comprises at least two different types of sensors from the group including a smoke detector, a heat detector, a carbon monoxide detector, a gas detector, a motion detector, a vibration detector, a light detector, a sound detector, and any multiple combination of these environmental condition detector types.

37. The environmental condition detector of claim 35 wherein said report of the condition of said battery power supply is an electronically prerecorded verbal message.

38. The environmental condition detector of claim 35 including electronic circuits to select from more than one language type in which the audible verbal commands are recognized.

* * * * *